US012596201B2

(12) United States Patent
Chiang et al.

(10) Patent No.: US 12,596,201 B2
(45) Date of Patent: Apr. 7, 2026

(54) COMBINED CONFIGURATION OF A FREE-FIELD SENSOR, A STRUCTURAL SENSOR, A DEEP-WELL SEISMOGRAPH, AND A REMOTE SIGNAL SOURCE, AND ITS EARTHQUAKE DETECTING SYSTEM

(71) Applicant: P-Waver Inc., Taipei (TW)

(72) Inventors: Hung-Wei Chiang, Taipei (TW); Pei-Yang Lin, Taipei (TW); Hsiu-Hsien Wang, Taipei (TW)

(73) Assignee: P-WAVER INC., Taipei City (TW)

( * ) Notice: Subject to any disclaimer, the term of this patent is extended or adjusted under 35 U.S.C. 154(b) by 626 days.

(21) Appl. No.: 18/156,706

(22) Filed: Jan. 19, 2023

(65) Prior Publication Data

US 2024/0248222 A1      Jul. 25, 2024

(51) Int. Cl.
*G01V 1/01*          (2024.01)

(52) U.S. Cl.
CPC ...................................... *G01V 1/01* (2024.01)

(58) Field of Classification Search
CPC ....................................................... G01V 1/01
See application file for complete search history.

(56) References Cited

U.S. PATENT DOCUMENTS

| 8,686,850 B2 * | 4/2014 | Zeng ...................... | G08B 21/10 |
| | | | 340/539.1 |
| 11,714,207 B2 * | 8/2023 | Vancho .................. | G01V 1/003 |
| | | | 702/15 |

FOREIGN PATENT DOCUMENTS

| GB | 2183038 A | * | 5/1987 | ............. G01V 11/00 |
| TW | I553327 | | 11/2015 | |
| TW | I541528 | | 7/2016 | |

* cited by examiner

*Primary Examiner* — Elias Desta
(74) *Attorney, Agent, or Firm* — Michael W. Taylor; Wolter Van Dyke Davis, PLLC

(57) ABSTRACT

An earthquake detection system is disclosed. The earthquake detection system includes a main sensor, a first backup sensor, a second backup sensor and a third backup sensor. The main sensor is disposed on a free field. The first backup sensor is disposed on a structure. The second backup sensor is disposed below a ground surface at a depth of at least 20 meters. The third backup sensor is disposed at a remote end relative to the main sensor, and outputs a remote signal through a network so as to avoid misjudging the occurrence of earthquakes because of unnatural factors, and prevent the vibration caused by human activities from interfering with the detector. The earthquake detection system achieves the effect of verification through a plurality of sensors installed in different positions. Only when all the sensors confirm that there is an earthquake, an earthquake warning will be issued to the protected place.

12 Claims, 7 Drawing Sheets

COMBINED CONFIGURATION OF A FREE-FIELD SENSOR, A STRUCTURAL SENSOR, A DEEP-WELL SEISMOGRAPH, AND A REMOTE SIGNAL SOURCE, AND ITS EARTHQUAKE DETECTING SYSTEM

FIELD OF THE INVENTION

The present invention relates to earthquake detection, especially as it relates to earthquake detection methods and devices using multiple sensors, particularly for high-value areas such as administrative agencies, highly-dense financial institutions, and the buildings therein.

BACKGROUND OF THE INVENTION

Many natural disasters, such as typhoons, volcanic eruptions, etc., are mostly predictable hours to days in advance. However, the occurrence of "earthquakes" is unpredictable, and there is no sign even before it occurs. Until now, only a modest improvement in detection at the beginning of an earthquake has been possible. Looking at the basics of earthquake detection, seismic waves can be divided into "P waves" and "S waves" due to their speed from fast to slow. Among them, the S wave is more destructive, but the speed is slower, and it reaches the surface (free field) the latest; while the P wave having small amplitude and low destructive power has a faster wave speed and reaches the free field the fastest. Therefore, during an earthquake early warning, the earthquake detector can be used to detect earthquake waves to give an early warning, and to issue an alarm and take measures before things get more serious. The specific prediction method is to use the characteristics of the fastest wave speed and the earliest arrival of the P wave to predict the early warning of the S wave arriving later. The current mainstream earthquake early warning or sensing systems are mainly divided into regional type and on-site type. The general principle of the regional type is based on the basic earthquake locating and the method of determining earthquake scale. The technology of "regional earthquake early warning" can be shortened in about 20 seconds. As for the on-site Earthquake Early Warning System, it uses the information in the first few seconds after the earthquake observation station deployed in a certain place and is triggered to make an immediate judgment on the destructiveness of the earthquake. Then, an early warning message to the local area is issued. This mode is generally triggered by individual stations, which can effectively reduce the cost of early warning deployment and narrow the scope of early warning blind spots.

However, earthquake detectors often make mistakes due to ground vibrations caused by human activities (eg, people running, vehicles passing by, construction sites, and heavy industrial factories). Therefore, how to avoid the misjudgment of seismographs caused by unnatural factors is also one of the current research directions. Conventional technologies such as the Republic of China Patent No. 1541528 discloses the setting method of the sensor, but does not disclose the preconditions for use and the applicable field, and also does not disclose the use of a remote signal source as a source of the backup sensing signal of the local earthquake detection system, which has limited effects on reducing misjudgment. In addition, if other sensors fail or the signal cannot be transmitted, the probability of misjudgment will increase. As for the Republic of China Patent No. 1553327, although it is proposed that human activities will cause misjudgment by the seismometer, the solution is to judge by a single threshold value. When there are several types of unnatural vibrations in the field, this method faces challenges.

Therefore, the main purpose of the present invention is to provide a kind of earthquake detection system, and carry out special planning for various places that need to be protected. For this reason, the present applicant has made great efforts to propose "the combined configuration of the free field sensor, the structural sensor, the deep well seismograph, and the remote signal source, and its earthquake detection system", which can avoid false alarms due to ground vibrations caused by unnatural factors, and improve the accuracy of seismic detection.

SUMMARY OF THE INVENTION

In order to avoid unnatural factors from triggering the earthquake detector and prevent vibrations caused by human activities from interfering with the detector, the present invention achieves the effect of checking by installing a plurality of sensors at different locations. Only when each sensor agrees to record an earthquake, or at least two of them agree to record an earthquake, will an earthquake warning be issued to the protected site. Four sensors set in different environments are used to avoid drawbacks of the simultaneous misjudgment of two detectors due to the same interference that the detectors may receive in the same environment. "The combined configuration of the free filed sensor, the structural sensor, the deep well seismograph, the remote signal source, and its earthquake detection system" in the present invention further refers to applications such as government ministries, central or local government locations, courts, banks, financial institutions having safe deposit boxes, and their office buildings and other similar environments. Such environments are characterized by a large number of people, and store a large amount of confidential information, servers and high-value movable properties such as gold bars, negotiable securities, cash, gold and silver jewelry, antiques, etc. As for human activities in the environment, the vibrations caused are much less than the vibrations caused by a factory. That is to say, for such an environment, the setting position of the sensor is optimized in order to fully achieve accurate detection and perfect configuration. Furthermore, since the misjudgment rate is reduced, the economic loss caused by the suspension of work due to misjudgment can be reduced, and the inconvenience and false alarm caused by taking evacuation measures due to misjudgment can also be reduced, thereby improving the quality of life.

In accordance with one aspect of the present invention, an earthquake detection system for a combination configuration of a free field sensor, a structural sensor, a deep well seismographs and a remote signal source is disclosed. The earthquake detection system includes a host, a main sensor and a plurality of backup sensors. The main sensor is disposed on a free field. The plurality of backup sensors are connected to the host, at least one of which is disposed below a ground surface at a depth greater than or equal to 20 meters as a deep well seismograph, and at least another one of which is disposed on a structure as a structural sensor. The remote signal source is disposed at a remote end relative to the main sensor, connected to the host through a network, and configured to transmit a remote signal to the host.

In accordance with another aspect of the present invention, an earthquake detection system for a combination configuration of a free field sensor, a structural sensor, a deep well seismographs and a remote signal source is disclosed. The earthquake detection system includes a main sensor, a first backup sensor, a second backup sensor and a third backup sensor. The main sensor is disposed on a free field as a free field sensor. The first backup sensor is disposed on a structure. The second backup sensor is disposed below a ground surface at a depth of at least 20 meters. The third backup sensor is disposed at a remote end relative to the main sensor, and outputs a remote signal through a network. Wherein, sensing signals output by the main sensor, the first backup sensor and the second backup sensor, and the remote signal all arrive at the same receiving device.

BRIEF DESCRIPTION OF THE DRAWINGS

The above objectives and advantages of the present invention will become more readily apparent to those ordinarily skilled in the art after reviewing the following detailed descriptions and accompanying drawings, in which.

DETAILED DESCRIPTION OF THE PREFERRED EMBODIMENT

The present invention will now be described more specifically with reference to the following embodiments. It is to be noted that the following descriptions of the preferred embodiments of this invention are presented herein for the purposes of illustration and description only; they are not intended to be exhaustive or to be limited to the precise form disclosed.

In the present disclosure, an on-site earthquake early warning station may include a sensor and a computing module.

Figure 1:
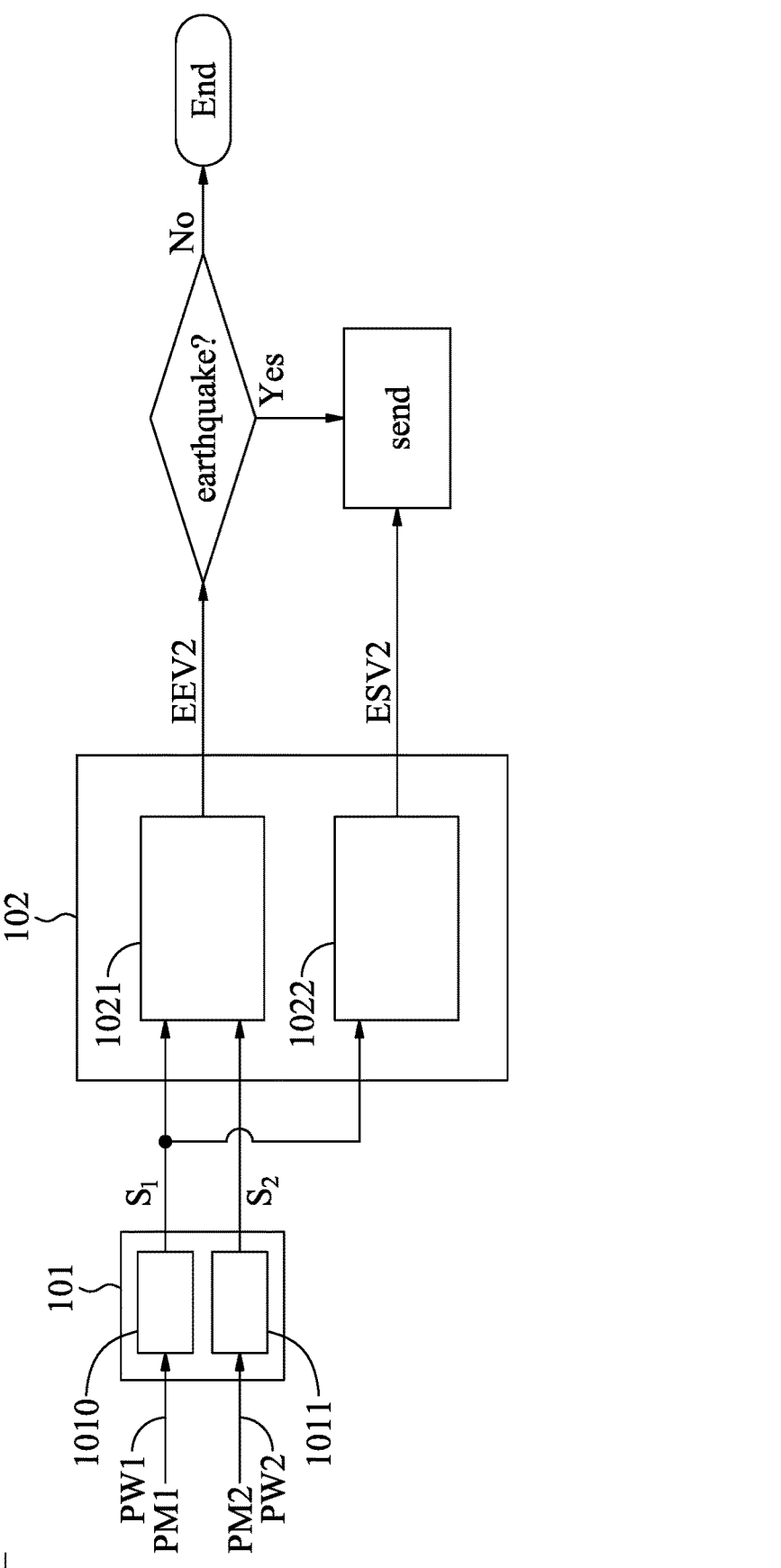
FIG. 1 is a schematic diagram of a single execution of an on-site system for determining earthquakes and estimating the seismic wave intensity according to a preferred embodiment of the present invention.

Please refer to FIG. 1, which is a schematic diagram of a single execution of an on-site system for determining earthquakes and estimating the seismic wave intensity according to a preferred embodiment of the present disclosure (that is, in fact, monitoring and estimation can be performed continuously and repeatedly in real time). The system 10 includes an earthquake detection configuration 101 and a computing module 102. The earthquake detection configuration 101 detects vibration waves PW1/PW2 at different locations in the same area. According to one embodiment, the earthquake detection configuration 101 includes a main sensor 1010 and a backup sensor 1011 located at different detection locations. Wherein, the backup sensor mentioned in this disclosure can be designed to increase the decision-making accuracy of the earthquake detection system, and in some embodiments, it can also be used when the main sensor fails to replace the function of the main sensor.

Those skilled in the art understand that when an earthquake occurs, the main sensor 1010 and the backup sensor 1011 disposed at different locations in the same area will sense vibrations at almost the same time. The main sensor 1010 and the backup sensor 1011 generate the first signal S1 and the second signal S2 in response to the first vibration wave PW1 and the second vibration wave PW2, generated by the first vibration event PM1 and the second vibration event PM2 respectively. These signals are simultaneously sent to the computing module 102. The main sensor 1010 described here is mainly used to detect various vibrations caused by earthquakes, such as longitudinal waves or transverse waves, and the second signal S2 of the backup sensor 1011 can be used to determine whether the first vibration wave PW1 detected by the main sensor 1010 is generated by the same seismic event. According to different embodiments, the backup sensor 1011 may include a set of sensing elements (not shown), which do not depart from the scope of the present invention.

According to an embodiment, the computing module 102 includes a determining module 1021 and a prediction module 1022. The determining module 1021 receives the first and second signals S1 and S2, and determines whether there is an earthquake event accordingly. Those skilled in the art can understand that when an earthquake occurs, the main sensor 1010 and the backup sensor 1011 located at different locations in the same area will almost simultaneously sense vibrations with very similar timeliness and magnitude. Therefore, comparing the common correlation between the first and the second signals S1 and S2 can determine whether an earthquake occurs. According to an embodiment of the present invention, the first signal S1 is synchronously transmitted to the determining module 1021 and the prediction module 1022, and the second signal S2 is transmitted to the determining module 1021, so that these two modules having independent functions can execute their respective tasks synchronously. According to an embodiment, the determining module 1021 sends an earthquake event determining signal EEV2 to indicate whether there is an earthquake event. For example, if the earthquake event determining signal EEV2 is 1, it means that the determining result shows that there is an earthquake event. The determination module 1021 provides a real-time determination of whether there is an earthquake event, which can avoid false alarms caused by false messages.

The prediction module 1022 receives the first signal S1 and estimates the real-time seismic transverse wave prediction characteristic value ESV2 of the upcoming seismic transverse wave accordingly. According to an embodiment, the first signal S1 includes longitudinal wave acceleration data in various directions on the ground surface, such as acceleration data in at least one of the horizontal direction or the vertical direction, and the real-time seismic transverse wave prediction characteristic value includes a maximum ground surface acceleration value and a maximum ground surface velocity value. This characteristic parameter is usually regarded as an important indicator for measuring the seismic intensity level by various countries.

Referring to FIG. 1 again, when the earthquake event determining signal EEV2 sent by the determining module 1021 shows the existence of an earthquake event, the computing module 102 can send the real-time seismic transverse wave prediction characteristic value ESV2 to a predetermining unit to provide earthquake warnings. Because the determining module 1021 and the prediction module 1022 in the computing module 102 operate in parallel, the earthquake warning information (such as the real-time prediction characteristic value of the seismic transverse wave ESV2) can be provided to each unit in the area in a short period of time to perform disaster prevention actions.

Figure 2:
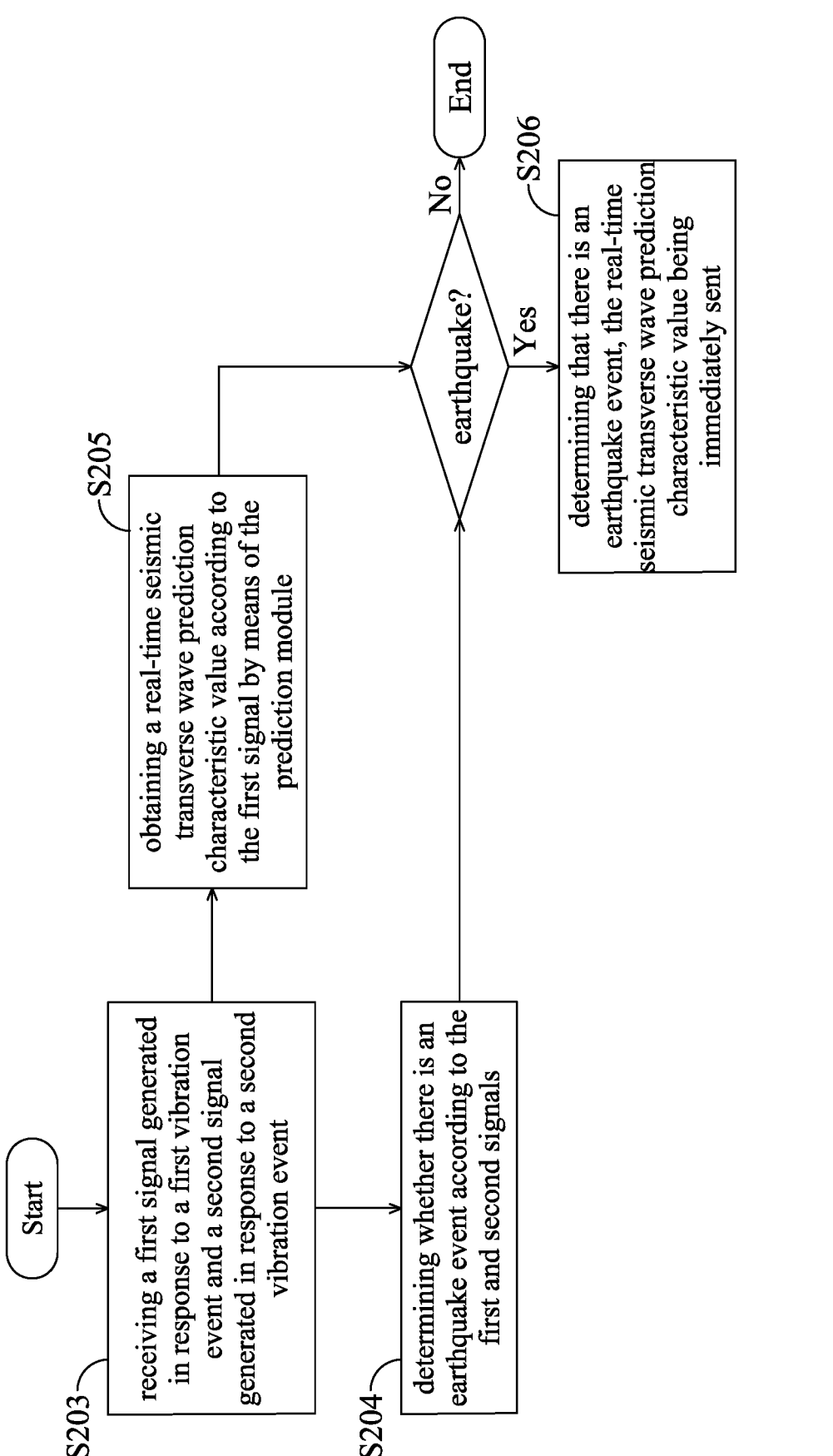
FIG. 2 is a schematic diagram showing a single execution of a method for determining earthquakes and estimating the seismic wave intensity for an on-site type according to a preferred embodiment of the present invention.

According to another point of view, refer to FIG. 2 in conjunction with FIG. 1. FIG. 2 is a schematic diagram showing a single execution of a method for determining earthquakes and estimating the seismic wave intensity for an on-site type according to a preferred embodiment of the present disclosure, including the following steps. When an earthquake or a similar event occurs, the earthquake determining method proposed in the embodiment of the present invention can receive a first signal S1 generated in response to a first vibration event PM1, and a second signal S2 generated in response to a second vibration event PM2 through an appropriate device (Step S203). It should be noted that the first and second signals S1 and S2 come from earthquake detection devices at different locations, which can detect vibration waves generated by earthquakes. If the first and second vibration events PM1 and PM2 are caused by an earthquake event, then the first and second signals S1 and S2 measured by the earthquake detection devices at different locations should have similar properties, or it can be said that the data such as the timing and amplitude of the ground surface vibrations from the two signals should be closely related. Therefore, the embodiment of the present invention can determine whether there is an earthquake event according to the first and the second signals S1 and S2 (Step S204). This can avoid the possibility of misjudging ordinary ground vibration events as earthquakes, and even triggering false alarms.

The method for determining the earthquake and estimating the seismic wave intensity for an on-site type in the embodiment of the present invention is to simultaneously perform the determining of whether it is an earthquake event, and estimate the magnitude of the earthquake. That is, while performing Step S204, the prediction module 1022 can be used to estimate a real-time seismic shear wave estimation characteristic value ESV2 according to the first signal S1 (Step S205), but is not limited to estimating the maximum ground surface acceleration value caused by the shear wave according to the acceleration-related parameters of the longitudinal wave; when the method of Step S204 is used to determine that there is an earthquake event, the real-time seismic shear wave estimated characteristic value is immediately sent (Step S206).

Since Steps S204 and S205 are synchronously operated, compared with the pre-or-post prediction method, the earthquake warning information (such as the real-time seismic transverse wave prediction characteristic value ESV2) can be provided immediately for disaster prevention actions for each unit in the area. Moreover, no matter what the prediction characteristic value ESV2 of the real-time seismic transverse wave estimated in Step S205 is, if the determining result of Step S204 is not an earthquake event, the estimated value will not be sent out to avoid triggering a false alarm.

Therefore, the overall comprehensiveness of the early warning system using this embodiment can also be effectively improved.

Figure 3:
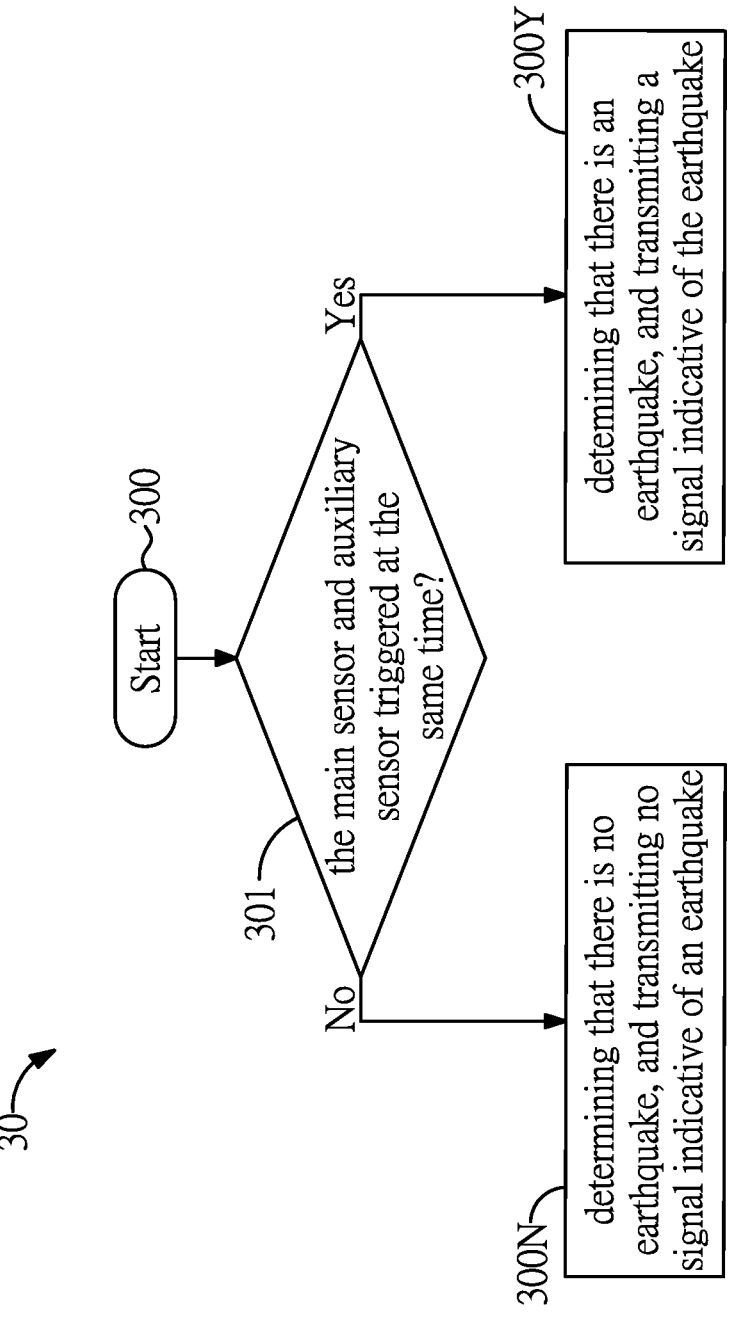
FIG. 3 is block diagram of the earthquake determination process according to a preferred embodiment of the present invention.

Please refer to FIG. 3 illustrating the earthquake determination process 30. In Step 300 which is "Start", the system test is completed, and each sensor and the host (not shown in FIG. 3) are in a normal power-on condition and are electrically powered. Then, the process proceeds to Step 301 (which is a determining step): determine whether the main sensor and remote signal source cause the host to determine that there is an earthquake at the same time. If the main sensor and remote signal source trigger the host to determine that there is an earthquake at the same time, the process proceeds to Step 301Y: determine that there is an earthquake and transmit a signal indicative of the earthquake. If the main sensor and the remote signal source do not trigger the host to determine that there is an earthquake at the same time, the process proceeds to Step 301N: determine that no earthquake occurs and transmit no signal indicative of an earthquake. Triggering at the same time substantively means triggering within a specific time length which can be, e.g. six seconds, or less or more. Furthermore, the remote signal source is connected to the host via an internet to transmit a remote signal to the host. If the remote signal source is a backup sensor, the remote signal represents a measurement value, which will be used by the host for calculation to obtain an acceleration signal, a velocity signal, or a displacement signal. If the remote signal source is a backup earthquake detection system, the remote signal is a trigger signal.

Figure 4:
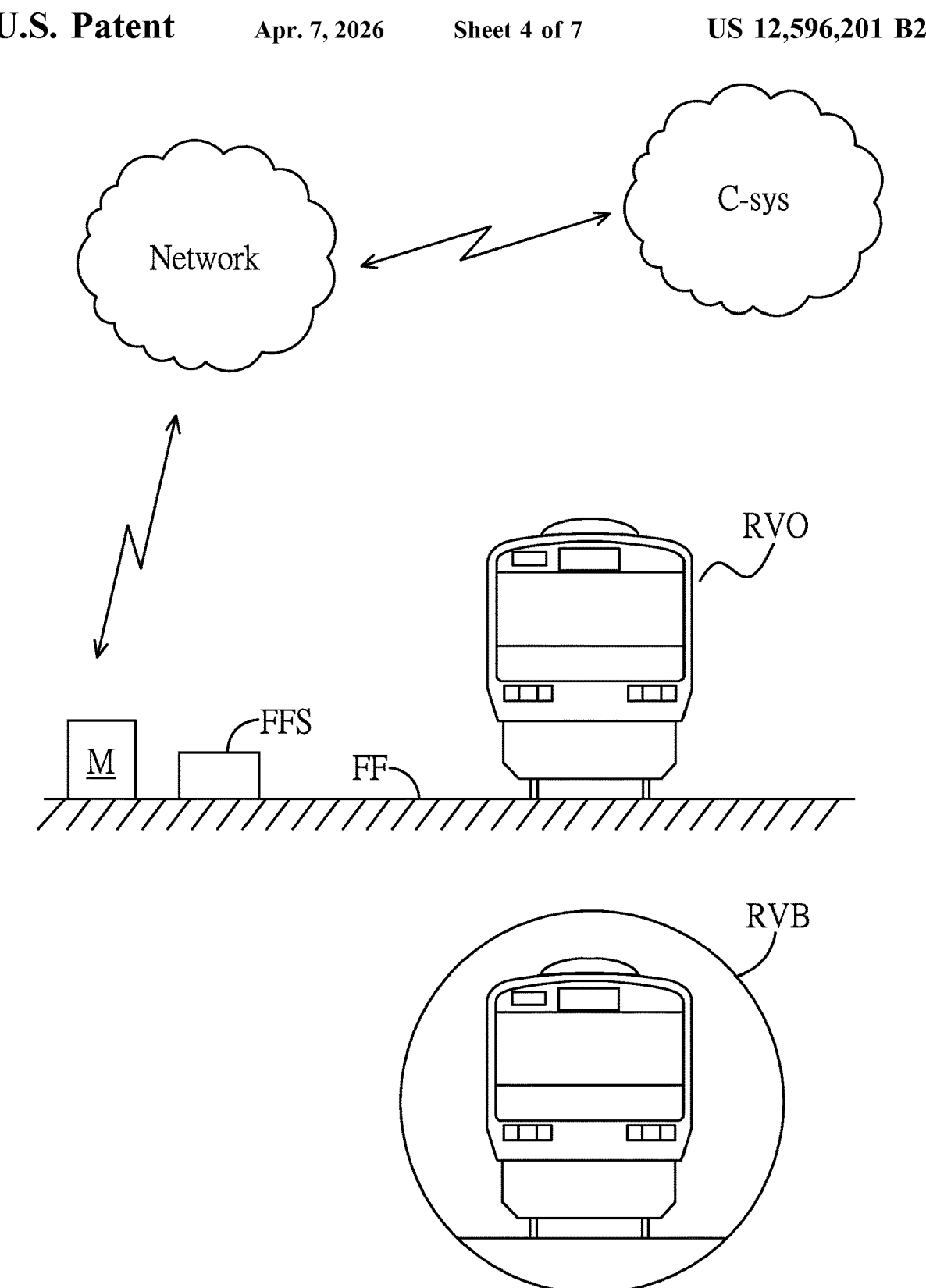
FIG. 4 is a schematic diagram illustrating the combined arrangement of the free field and remote signal source and its earthquake detection system according to a preferred embodiment of the present invention.

Please refer to FIG. 4 which is a schematic diagram illustrating the combined configuration of the free field and the remote signal source and its earthquake detection system according to an embodiment of the present invention. In FIG. 4, there are two types of ways to arrange and connect the sensors. In the free field FF, the free field sensor FFS (main sensor) is arranged. The free field FF generally includes the space on the ground and the space within two meters below the ground for the arrangement. In addition, there can be a host M arranged in the free field FF. The host includes a computing unit, transmitting interface, or communication interface (not shown in the figure). The host M can be arranged outdoors, or arranged in a structure (not shown in the figure) in a protected field. The sensors are sometimes susceptible to non-earthquake, artificial vibrations, such as the vibrations caused by the rail vehicle. This type of artificial vibration typically has a large amplitude, a low frequency, and a strong penetrating power. Therefore, to avoid these interferences, the sensors should be arranged in a sufficiently long distance. In addition, because the signal transmitted by the signal line of the sensor is an analog signal, the strength of the signal will greatly attenuate due to the long distance. Therefore, when the sensor used as a backup sensor is arranged in a distance up to hundreds of meters to avoid the interferences, the sensing signal of this backup sensor can be transmitted via an internet to prevent it from being influenced by the signal attenuation resulting from the physical line.

Please still refer to FIG. 4. The remote signal source can be another earthquake detection system C-sys (i.e. having its own host) to serve as a remote system. That is, the remote signal source serves as an earthquake sensing signal source in a long distance and can be a sensor being a backup sensor for the local (on-site) place. The remote signal source can also be an earthquake detection system being a remote backup earthquake detection system C-sys for the local (on-site) place. The remote signal source, when being a remote backup earthquake detection system C-sys, transmits an outgoing remote signal which is a trigger signal. The remote signal source can be used in the following conditions: the field where the main sensors are arranged does not have enough regions and thus the backup sensor cannot be arranged in a slightly long horizontal distance; in the protected field, no deep well is available to arrange a sensor therein, so that if the artificial structure (especially the rail overpass or the tunnel structure where no structural sensor can be used) per se has a vibrating source (such as the rail vehicle) which will generate vibrations, no structural sensor can be used. In case of such unsuitable places above, the remote signal source can be utilized.

In addition, the remote signal source can be used as a backup for any other sensor suffering from a severe interference. In FIG. 4, the rail vehicle on or under the ground sometimes generates relatively low-frequency vibrations with a strong penetrating power to propagate over a long distance, so even if a deep well seismograph is used, the sensor may still suffer from serious noise interferences. Therefore, in addition to the main sensor FFS according to a normal arrangement, it is more appropriate to use the remote signal source DS in the arrangement. Accordingly, the remote signal source of the present invention is characterized in that, based on advantage of the long distance transmission via the internet, there can be a long distance from each backup sensor or the remote backup detection system (the remote backup earthquake detection system C-sys) to the on-site main sensor of the system. Therefore, there can be a connection to the host M via the internet to achieve the effect of rechecking whether an earthquake occurs. Additionally, the remote backup earthquake detection system C-sys per se is an on-site system and can have its own remote signal source.

Figure 5:
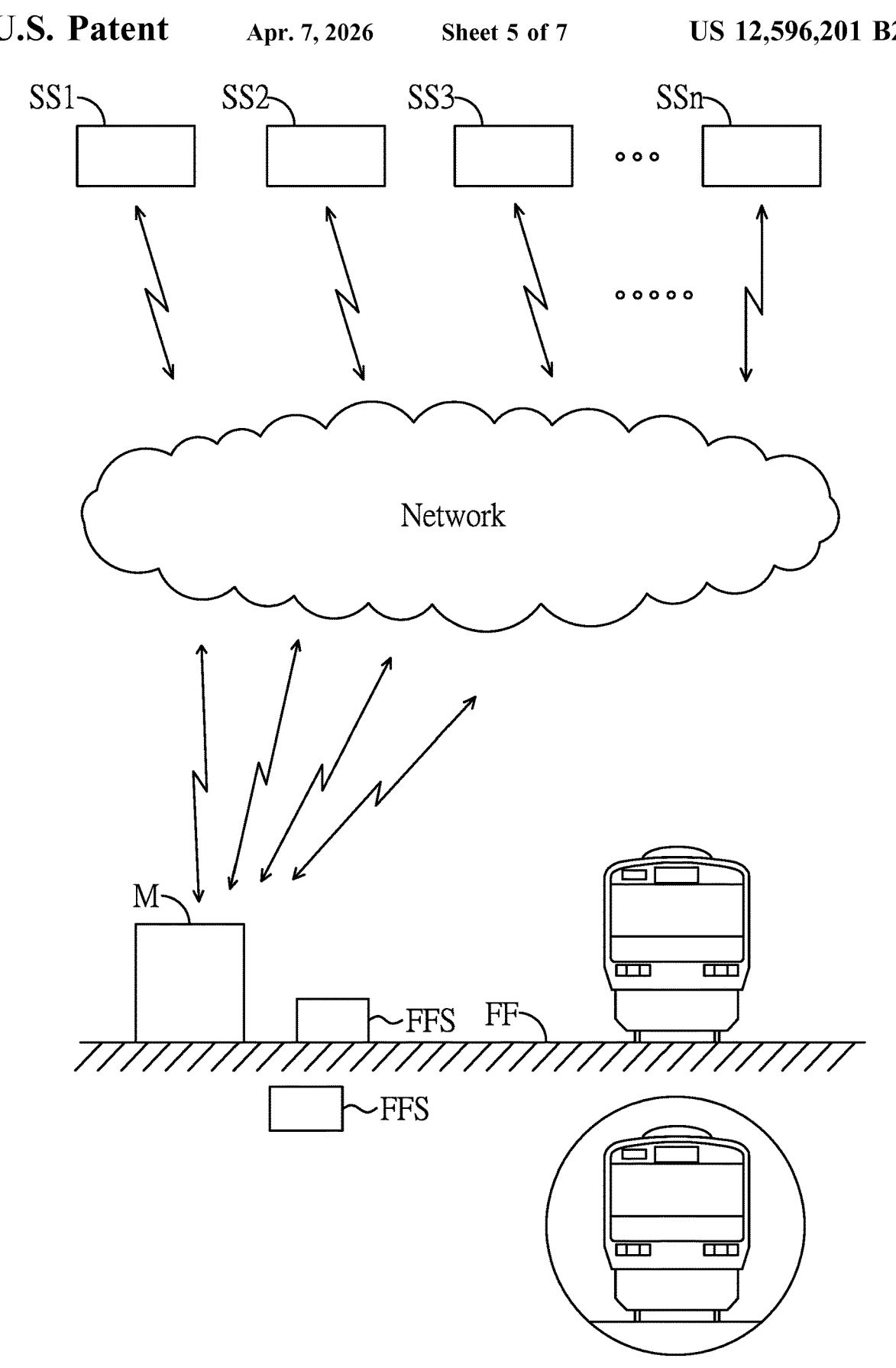
FIG. 5 is another schematic diagram illustrating the combined arrangement of the free field and remote signal source and its earthquake detection system according to a preferred embodiment of the present invention.

Please refer to FIG. 5 which is a schematic diagram illustrating a combined arrangement of the free field and remote signal source and its earthquake detection system according to an embodiment of the present invention. There are a first backup sensor SS1, a second backup sensor SS2, a third backup sensor SS3, a fourth backup sensor SS4, . . . , and an $N^{th}$ backup sensor SSn which are connected to the local host M via the internet connection. In the free field, a main sensor FFS is locally arranged on the ground or within two meters below the ground. FIG. 5 can be understood as illustrating an embodiment where each backup sensor is an individual device serving as a remote signal source to transmit an earthquake sensing result to the local (on-site) host M via the internet. If there are a plurality of remote signal sources, the signal sources are remotely arranged (i.e., being arranged at a remote end) with respect to the main sensor. The plurality of signal sources can be arranged in the same field or different fields at the remote end. The remote end refers to the concept of being in a long distance, i.e., the remote signal source is in a long distance from the main sensor. The remote signal source, when being a backup sensor, transmits an outgoing remote signal representing a measurement value, with which the host makes a calculation to provide an acceleration signal, a velocity, or a displacement signal. In addition, the remote signal source, if having the capability of making a calculation, can autonomously convert the measurement value into an acceleration signal, a velocity signal, a displacement signal, two of them, or all of them, so as to be transmitted via an internet to the host.

Figure 6:
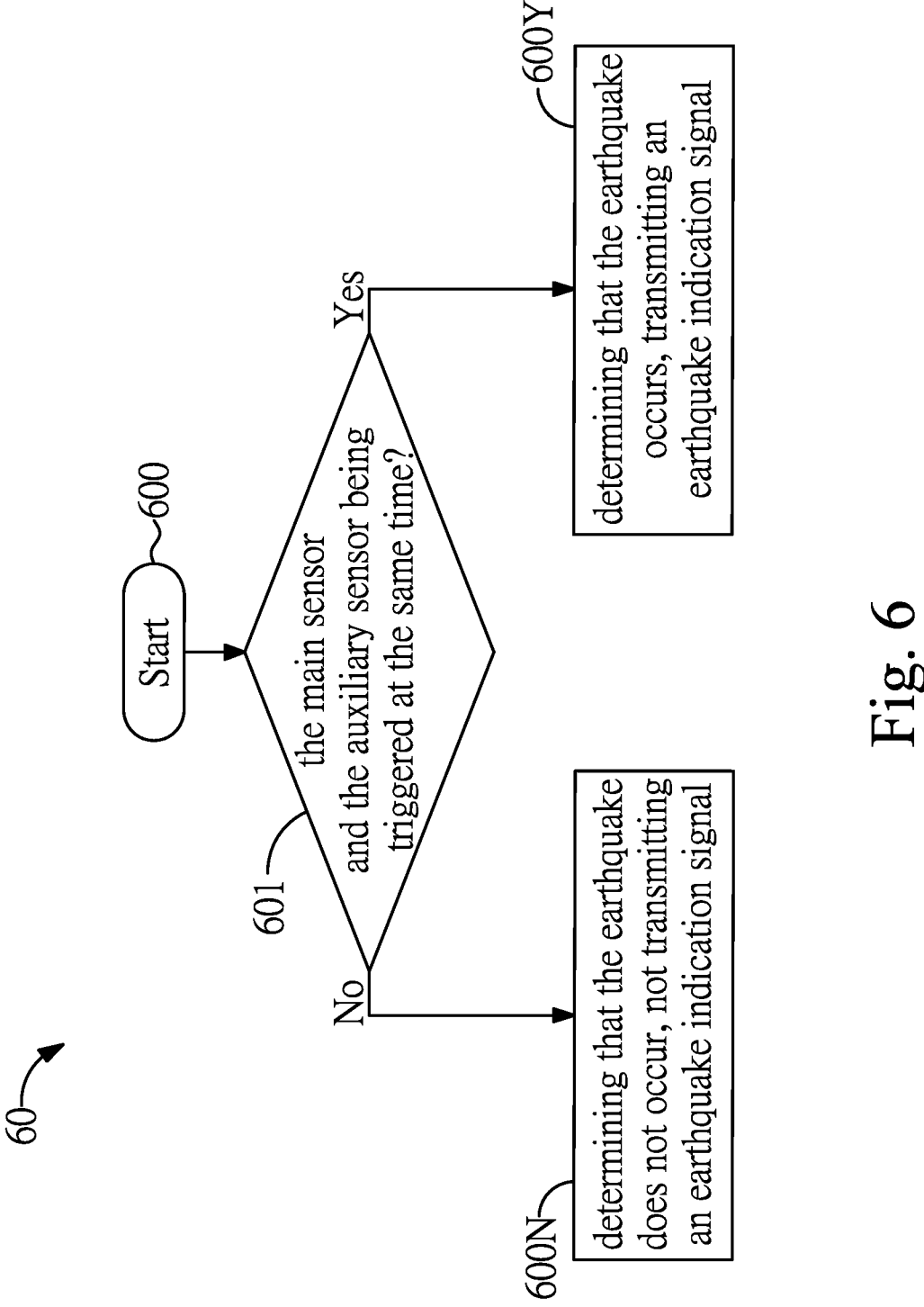
FIG. 6 is a block diagram showing earthquake determining blocks according to a preferred embodiment of the present invention.

Please refer to FIG. 6, which discloses the earthquake determination process 60, including the following steps. Step 600 is "start", which means that after the system test is completed, each sensor and the host (not shown in FIG. 6) are in a normal power-on state and electrically powered. Next, go to Step 601: whether the main sensor, the plurality of backup sensors, and the remote signal source confirm that there is an earthquake at the same time. This step refers to a determination step. If the main sensor, the plurality of backup sensors, and the remote signal source all make the host confirm that there is an earthquake at the same time, the process goes to Step 601Y: determining that an earthquake occurs, and transmitting an earthquake indicating signal. In addition, if the main sensor, the backup sensor, and the remote signal source do not make the host confirm that there is an earthquake at the same time, the process proceeds to Step 601N: determining that the earthquake does not occur, and the earthquake indication signal is not transmitted. The triggering at the same time mentioned here essentially refers to triggering within a specific time length, and the specific time length is six seconds or shorter. Furthermore, the remote signal source is connected to the host through the network, and transmits a remote signal to the host. If the remote signal source is a backup sensor, the remote signal is selected from an acceleration signal, a velocity signal, or a displacement signal. In addition, if the remote signal source is a backup earthquake detection system, the remote signal is a trigger signal.

Figure 7:
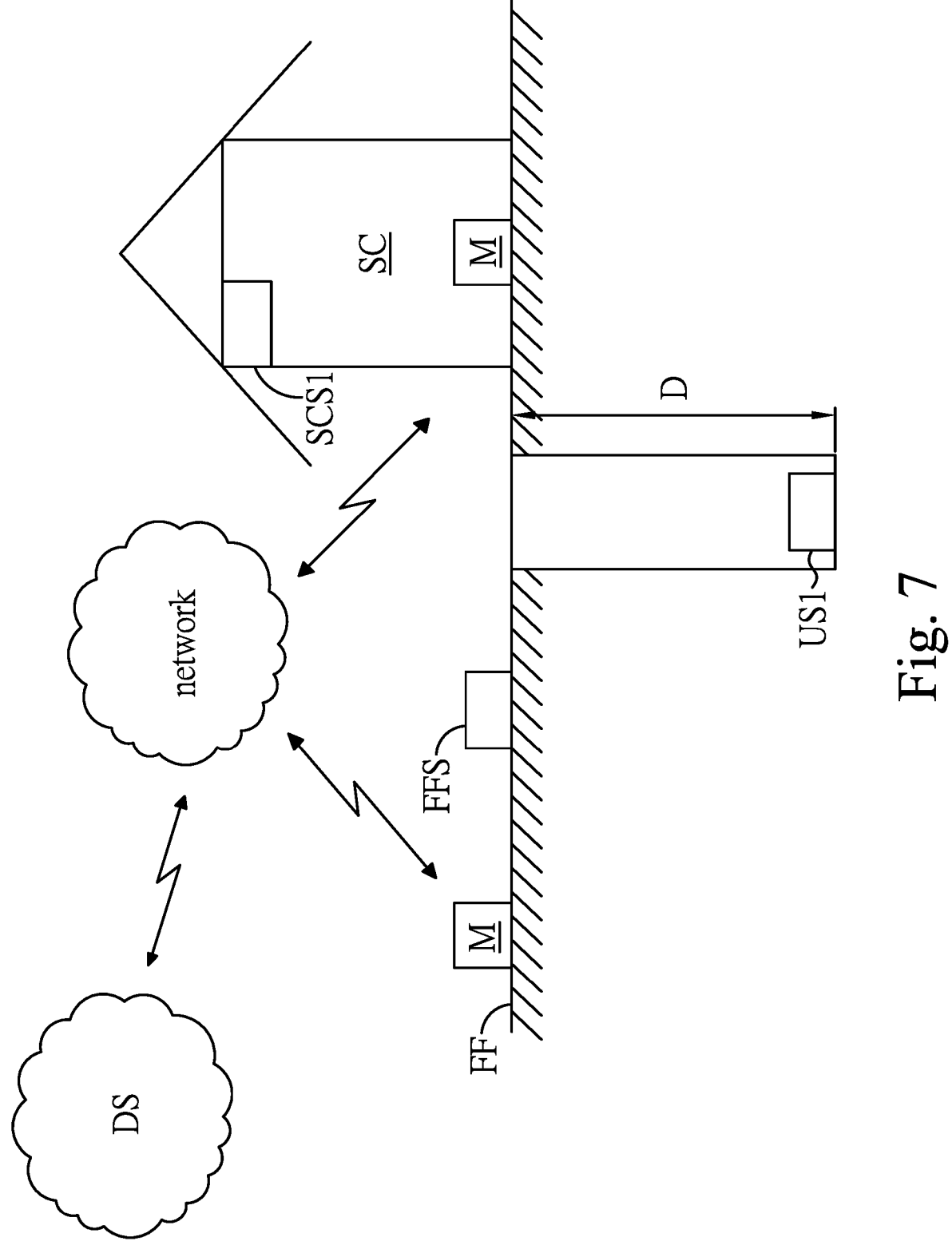
FIG. 7 is a schematic diagram showing the combined configuration of the free field sensor, the structural sensor, the deep well seismograph, and the remote signal source, and its earthquake detection system according to a preferred embodiment of the present invention.

Please refer to FIG. 7, which is a schematic diagram of the combined configuration of the free field sensor, the structural sensor, the deep well seismograph, and the remote signal source DS, and its earthquake detection system of an embodiment of the present invention. It can be seen that there are a total of four types of sensor configurations and connection methods. Firstly, the main sensor FFS (free field sensor) is disposed in the free field FF (free field, referring to the surface or a position very close to the surface). The free field roughly includes the space of the ground surface below and within two meters. The host M of the present embodiment is disposed in the free field FF, and the main sensor FFS is disposed next to the host M and is connected to the host M through a physical line. The host also includes a computing unit, a transmission or communication interface, etc. (not shown in the figure). Generally speaking, in order to facilitate adjustment and maintenance, the host M and the main sensor FFS will be disposed on the ground surface. The main sensor FFS disposed within a depth of two meters below the ground surface is called a shallow well sensor. The reason for utilizing the shallow well sensor is because sometimes the ground surface is susceptible to improper external forces. When being on the side of the school's sports field, there may be disturbances caused by various sports balls and sports apparatus, so that the probability of the sensor's misjudgment will be increased. Therefore, it is necessary to avoid these disturbances. However, if the sensor is disposed too deep below the ground surface FF, the deployment cost will be too high, so the main sensor FFS can be disposed within at most a depth of about two meters below the ground surface to avoid high construction costs and the difficulty of maintenance and adjustment. In addition, the host M can also be disposed in a structure in the protected field, such as a school, a residence, a commercial building, an indoor place, etc. Furthermore, in order to avoid the interference from buildings where human activities take place, etc., the horizontal distance from the free-field sensor FFS to the structures, or artificial constructions in the protected area should be at least 10 meters, preferably 30 meters, more preferably even farther.

Please continue to refer to FIG. 7, which also discloses a deep well seismograph US1 located in a deep well. The depth D of the deep well in the present embodiment is about twenty meters, and can reach a depth of up to fifty meters if circumstances permit. The reason for disposing the deep well seismograph US1 is to keep away from artificial vibration sources of roads by means of a vertical distance because the hinterland of the protected area is insufficient in many cases, so that the horizontal distance from the main sensor FFS to various buildings and structures in the protected area is short, and thus there is often the disturbance by vehicles passing by on the road. In addition, in order to save costs, the depth D of the respective deep well is mostly within 50 meters. However, due to the influence of the geology sometimes, e.g. the position of the batholith being relatively high, if the depth is less than 50 meters or even less than 20 meters, the deep well seismograph US1 is directly disposed on the batholith.

Please continue to refer to FIG. 7, which also discloses a structural sensor SCS1 located on the structure SC; generally speaking, it is disposed at the beam, the column, or the beam-column connection of the structure SC, which is for enabling the shock wave to be transmitted to the structural sensor SCS1 through the beam-column system. If there are no machines and appliances that generate huge vibrations in the building, the magnitude of the vibrations generated by humans themselves is limited. In addition, the vibrations generated by moving the furniture and electrical equipment, though being larger than those by humans walking, running, or jumping, will not be transmitted outside the building to trigger the free-field sensor FFS. The vibration amplitude of the compressor of the refrigeration and air-conditioning equipment is also small, and usually the machine itself has a shock-absorbing pad to greatly reduce the vibration transmission. The quite constant vibration pattern can be excluded by the system of the present embodiment, so it will not cause any interference to the structural sensor SCS1. For example, the structural sensor SCS1 can be applied to a structure such as a building in a dense area of administrative agencies and financial institutions according to the present embodiment. In addition, in order to further avoid human interferences, the structural sensor SCS1 can also be disposed on the top floor of the structure SC, such as a roof, and, preferably, it is disposed on the top of the column.

Please continue to refer to FIG. 7, which discloses the remote signal source DS, which may include one or more remote sensors as backup sensors, with its horizontal distance being away from the protected object possibly in a range from dozens of meters to hundreds of meters, or even three or four kilometers. In addition, the remote signal source DS can also be another earthquake detection system to serve as a remote backup earthquake detection system. That is, the remote signal source DS has its own host to be a remote system; it is connected to the host of the present embodiment through the internet. That is, the remote signal source DS is used as a remote earthquake sensing signal source, which can be a sensor being a backup sensor relative to the on-site earthquake detection system. The remote signal source DS can also be an earthquake detection system, which is a remote backup earthquake detection system relative to the on-site earthquake detection system. The timing of using the remote signal source DS is as follows: the hinterland of the protected field is not enough so that the backup sensor cannot be set in a far enough horizontal distance; the structural sensor SCS1 is often interfered with; or the depth of the deep well seismograph US1 is less than 20 meters. If there are the inappropriate places above, the remote signal source DS can be used. When there are multiple remote signal sources, it means that these signal sources are all disposed remotely relative to the main sensor. In other words, they are disposed at the remote end, but the multiple signal sources can be in the same field or different fields at the remote end. The remote end is a concept of a long distance, meaning that there is a long distance between the signal source of the remote end signal source and the main sensor. If the present embodiment is applied to buildings in densely populated areas such as administrative agencies and financial institutions, the structural sensor SCS1 can be used because there are few instruments that produce violent vibrations inside such structures. The purpose of using the deep well seismograph US1 is to avoid the vibration interference of large and heavy vehicles. The main sensor FFS can be used as a disposed point of the host. In addition, the remote signal source DS can be used as a backup in case other sensors fail. It can be seen that the structural sensor SCS1, the deep well seismograph US1 and the remote signal source DS are all used as backup sensors. Therefore, when each backup sensor and the main sensor determine the earthquake event has happened in a specific time length, the host sends an earthquake alarm.

Based on the above, the present disclosure provides an innovative concept, so that when an earthquake occurs, the characteristic values of the seismic transverse waves predicted reliably by the on-site earthquake prediction technology in real time according to the real-time longitudinal wave measurement data can be provided to meet the needs of the contingency. In addition, the present disclosure utilizes various sensors to achieve the effect of determining whether an earthquake occurs in a backup manner. If the hinterland is large enough, the backup sensor can be arranged in a longer horizontal distance. If there are vibrating sources (such as the rail structure, heavy industry plant, mining area, waterfall, etc.) generating interferences in a large range, the remote signal source can be used for effectively keeping the various interferences away. When a vibration event occurs, if the local main sensor and the remote backup sensor or the remote backup earthquake detection system C-sys both determine that the vibration event is an earthquake within a specific time length, the local host send an earthquake alarm. By means of the various configurations of the earthquake sensors, the accuracy in determining the occurrence of the earthquake can be improved. Based on limitations in the place where the main sensor is disposed, a plurality of appropriate remote backup sensors are provided to form the configuration. When the possibility of erroneously determining that the earthquake occurs is reduced, there will be fewer occurrences of downtime and material stopping, and thus there will be fewer delays or waste that can result therefrom. For the railway facility, the time cost resulting from the vehicle stopping or speed reduction can be decreased. Furthermore, because the possibility of making the erroneous determination can be reduced, there will be fewer conditions resulting therefrom to take evacuation measures, and thus the losses that can result from taking the disaster refuge can be reduced. The present disclosure also uses sensors with different configurations to achieve the effect of assisting in determining whether an earthquake has occurred. Of course, it is indeed worthy of providing protection and early warning with a sufficient budget to apply "the combined configuration of the free field sensor, the structural sensor, the deep well seismograph, and the remote signal source, and its earthquake detection system" of the present disclosure to buildings in densely populated areas of administrative agencies and financial institutions, so that the protected objects can be provided with as many protection configurations as possible. When one of the backup sensors is faulty or cannot be connected, the rest can still achieve the effect of rechecking whether an earthquake has occurred. Generally speaking, if the hinterland is large enough, the main sensor can be disposed at a longer horizontal distance. If there will be interference from vehicles near the structural sensors, deep well seismographs can be set up to keep the interference away through a longer vertical distance. Structural sensors can be provided if there is no vibration-generating machinery within the structure. In addition, with the addition of a remote signal source, various interferences can be kept away more effectively. Through the configuration of various earthquake sensors in the present disclosure, the misjudgment rate of earthquake predictions can be further reduced, and a suitable number of sensors can be provided to form a configuration according to the protected field restrictions, which avoids being out of service due to the failure of any one sensor. Furthermore, since the rate of misjudgment is reduced, the economic loss caused by the suspension of work due to misjudgment can be reduced, and the inconvenience and false alarm caused by taking evacuation measures due to misjudgment can also be reduced, thereby improving the quality of life. In other words, the rate of misjudgment is lower, the number of evacuation measures taken due to misjudgment will be reduced, and the losses caused by these evacuation measures will also be reduced. It can be seen that the present disclosure has made great contributions to related industries.

Those skilled in the art can understand that the various embodiments of the present invention described above can utilize electronic information equipments, devices, systems, or architectures, such as servers or computers, with appropriate software, hardware, or firmware for implementation.

EMBODIMENTS

1. An earthquake detection system includes a host, a main sensor and a plurality of backup sensors. The main sensor is disposed on a free field. The plurality of backup sensors are connected to the host, at least one of which is disposed below a ground surface at a depth greater than or equal to 20 meters as a deep well seismograph, and at least another one of which is disposed on a structure as a structural sensor. The remote signal source is disposed at a remote end relative to the main sensor, connected to the host through a network, and configured to transmit a remote signal to the host.

2. The earthquake detection system of Embodiment 1, wherein: when the remote signal source is a backup earthquake detection system, the remote signal is a trigger signal; and when the remote signal source is a backup sensor, the remote signal is a measurement value.

3. The earthquake detection system of any one of Embodiments 1-2, wherein the structure has a top floor, a beam, a column and a beam-column connection, and the structural sensor is disposed on the top floor and on the beam, the column, or the beam-column connection.

4. An earthquake detection system includes a main sensor, a host and a plurality of backup sensors. The main sensor is disposed on a free field. The host is disposed outdoors or in a structure, and connected to the main sensor. The plurality of backup sensors are connected to the host, one of which is disposed on the structure as a structural sensor and connected to the host, a first another one of which is disposed below a ground surface at a depth of at least 20 meters as a deep well seismograph, and at least a second another one of which is disposed at a remote end relative to the primary sensor and is configured to transmit a remote signal to the host through a network.

5. The earthquake detection system of Embodiment 4, further comprising a remote signal source being a backup sensor or a backup earthquake detection system, wherein when the remote signal source is the backup earthquake detection system, the remote signal is a trigger signal; and when the remote signal source is the backup sensor, the remote signal is a measurement value.

6. The earthquake detection system of any one of Embodiments 4-5, wherein a depth of the deep well seismograph is within 50 meters.

7. A combination configuration of a free field sensor, a structural sensor, a deep well seismograph and a remote signal source for an earthquake detection system includes a main sensor, a first backup sensor, a second backup sensor and a third backup sensor. The main sensor is disposed on a free field as a free field sensor. The first backup sensor is disposed on a structure. The second backup sensor is disposed below a ground surface at a depth of at least 20 meters. The third backup sensor is disposed at a remote end relative to the main sensor, and outputs a remote signal through a network. Wherein, sensing signals output by the main sensor, the first backup sensor and the second backup sensor, and the remote signal all arrive at the same receiving device.

8. The combination configuration of Embodiment 7, wherein when the third backup sensor is a backup earthquake detection system, the remote signal is a trigger signal; or when the third backup sensor is a sensor, the remote signal is a measurement value.

9. The combination configuration of Embodiment 7, wherein when the remote signal is from a backup earthquake detection system, the remote signal is a trigger signal; or when the remote signal is from a backup sensor, the remote signal is a measurement value.

10. The combination configuration of Embodiments 7, wherein when the main sensor, the first backup sensor, the second backup sensor and the third backup sensor all determine that there is an earthquake within a specific time length, the earthquake detection system confirms that there is an earthquake.

11. An earthquake detection system, which includes the combination configuration of any one of Embodiments 7 to 9.

While the invention has been described in terms of what is presently considered to be the most practical and preferred embodiments, the embodiments disclosed in the FIG. 1 to the FIG. 7 can be combined in an appropriate manner to achieve a synergistic effect. It is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An earthquake detection system configured with a combination of a free field, a structural sensor, a deep well seismograph and a remote signal source, comprising:
   a host;
   a main sensor disposed on a free field;

a plurality of backup sensors connected to the host, at least one of which is disposed below a ground surface at a depth greater than or equal to 20 meters as a deep well seismograph, and at least another one of which is disposed on a structure as a structural sensor; and a remote signal source disposed at a remote end relative to the main sensor, connected to the host through a network, and configured to transmit a remote signal to the host.

2. The earthquake detection system as claimed in claim 1, wherein:

when the remote signal source is a backup earthquake detection system, the remote signal is a trigger signal; and when the remote signal source is a backup sensor, the remote signal is a measurement value.

3. The earthquake detection system as claimed in claim 1, wherein the structure has a top floor, a beam, a column and a beam-column connection, and the structural sensor is disposed on the top floor and on the beam, the column, or the beam-column connection.

4. An earthquake detection system configured with a combination of a free field sensor, a structural sensor, a deep well seismograph and a remote signal source, comprising:

a main sensor disposed on a free field as a free field sensor;

a host disposed outdoors or in a structure, and connected to the main sensor; and a plurality of backup sensors connected to the host, one of which is disposed on the structure as a structural sensor and connected to the host, a first another one of which is disposed below a ground surface at a depth of at least 20 meters as a deep well seismograph, and at least a second another one of which is disposed at a remote end as a remote signal source relative to the main sensor and is configured to transmit a remote signal to the host through a network.

5. The earthquake detection system as claimed in claim 4, wherein:

when the remote signal source is the backup earthquake detection system, the remote signal is a trigger signal; and when the remote signal source is the backup sensor, the remote signal is a measurement value.

6. The earthquake detection system as claimed in claim 4, wherein a depth of the deep well seismograph is within 50 meters.

7. A combination configuration of a free field sensor, a structural sensor, a deep well seismograph and a remote signal source applied to an earthquake detection system, comprising:

a main sensor disposed on a free field as a free field sensor;

a first backup sensor disposed on a structure;

a second backup sensor disposed below a ground surface at a depth of at least 20 meters; and a third backup sensor disposed at a remote end relative to the main sensor, and outputting a remote signal through a network, wherein sensing signals output by the main sensor, the first backup sensor and the second backup sensor, and the remote signal all arrive at the same receiving device.

8. The combination configuration as claimed in claim 7, wherein:

when the remote signal is from a backup earthquake detection system, the remote signal is a trigger signal; or when the remote signal is from a backup sensor, the remote signal is a measurement value.

9. The combination configuration as claimed in claim 7, wherein when the main sensor, the first backup sensor, the second backup sensor and the third backup sensor all determine that there is an earthquake within a specific time length, the earthquake detection system confirms that there is an earthquake.

10. An earthquake detection system configured with a combination configuration of a free field sensor, a structural sensor, a deep well seismograph and a remote signal source applied to an earthquake detection system, comprising:

a main sensor disposed on a free field as a free field sensor;

a first backup sensor disposed on a structure;

a second backup sensor disposed below a ground surface at a depth of at least 20 meters; and a third backup sensor disposed at a remote end relative to the main sensor, and outputting a remote signal through a network, wherein sensing signals output by the main sensor, the first backup sensor and the second backup sensor, and the remote signal all arrive at the same receiving device.

11. The earthquake detection system as claimed in claim 10, wherein:

when the remote signal is from a backup earthquake detection system, the remote signal is a trigger signal; or when the remote signal is from a backup sensor, the remote signal is a measurement value.

12. The earthquake detection system as claimed in claim 10, wherein when the main sensor, the first backup sensor, the second backup sensor and the third backup sensor all determine that there is an earthquake within a specific time length, the earthquake detection system confirms that there is an earthquake.

* * * * *